United States Patent [19]

Itzin et al.

[11] Patent Number: 5,711,228
[45] Date of Patent: Jan. 27, 1998

[54] DRIVEN TROLLEY FOR SUSPENSION FROM AND TRAVEL ON A RAIL

[75] Inventors: Bernd Itzin; Heiko Bollow, both of Weil am Rhein, Germany

[73] Assignee: Wampfler GmbH, Weil am Rhein, Germany

[21] Appl. No.: 800,099

[22] Filed: Feb. 13, 1997

Related U.S. Application Data

[63] Continuation of Ser. No. 542,900, Oct. 13, 1995, abandoned.

[30] Foreign Application Priority Data

Oct. 13, 1994 [DE] Germany .................. 44 36 520.9

[51] Int. Cl.[6] .................................................. B61B 3/02
[52] U.S. Cl. ..................... 105/154; 105/150; 105/106; 104/95; 104/295
[58] Field of Search .................... 105/101, 106, 105/133, 148, 150, 154; 104/89, 93, 95, 295

[56] References Cited

U.S. PATENT DOCUMENTS

| | | | |
|---|---|---|---|
| 1,530,785 | 3/1925 | Montine | 105/150 |
| 1,663,690 | 3/1928 | Ellis | 105/150 |
| 1,987,753 | 1/1935 | Schmidt | 105/106 |
| 2,571,832 | 10/1951 | Chapin, Jr. | 105/150 |
| 3,837,291 | 9/1974 | Umlor | 105/101 |
| 4,034,679 | 7/1977 | Gaither et al. | 104/138.2 |
| 4,919,057 | 4/1990 | Riley | 104/295 |

FOREIGN PATENT DOCUMENTS

| | | | |
|---|---|---|---|
| 10459 | 11/1927 | Australia | 105/154 |
| 143214 | 10/1920 | United Kingdom | 105/154 |

*Primary Examiner*—S. Joseph Morano
*Attorney, Agent, or Firm*—Antonelli, Terry, Stout, & Kraus, LLP

[57] ABSTRACT

A driven trolley for suspension from and travel on a rail comprised of a pair of co-axial supporting wheels carried on shafts, one of the supporting wheels being disposed for location on each side of the rail, a driving motor having a driving shaft parallel with the supporting wheel shafts, and the ends of the motor driving shaft being connected by first and second belt drive apparatus to the supporting wheel shafts.

26 Claims, 1 Drawing Sheet

5,711,228

DRIVEN TROLLEY FOR SUSPENSION FROM AND TRAVEL ON A RAIL

This application is a continuation application of Ser. No. 08/542,900, filed Oct. 13, 1995 now abandoned.

FIELD OF THE INVENTION

This invention relates to a driven trolley for suspension from and travel on a rail. The invention particularly but not exclusively relates to a line trolley for use with a drag line device.

BACKGROUND OF THE INVENTION

Similar line trolleys are described for example in German Patent DE 26 28 112 C2 of the Applicant. In this case, these are passive line trolleys, i.e. line trolleys without their own drive. In addition, there are driven line trolleys in particular for use with heavy loads, for example with a linear motor drive or with a gearbox motor drive using a direct current motor which drives the main supporting wheels by means of toothed belts or a separate driving wheel by means of a friction wheel drive.

Such known drives for line trolleys have the drawback that a gearbox has to be used in order to reduce the high speed of the direct current motor to the speed required to drive the supporting wheels. Mostly a bevel gear gearbox is used for this. However, each gearbox means additional production effort and cost and takes up a considerable amount of space. This is disadvantageous in particular because in the case of line trolleys space is often at a premium and a low unit height is imperative. The known drive methods are particularly disadvantageous when it is necessary to drive a plurality of supporting wheels, for example on both sides of the supporting rail, since complicated idler gears and ratios are required in the drive line for this purpose. Due to the slip occasionally occurring during operation of the line trolley, the known driven line trolleys must also have slip clutches for all the driven supporting wheels in order to prevent damage to the drive.

SUMMARY OF THE INVENTION

An object of the present invention is to provide a driven trolley such that the supporting wheels can be driven at low cost while requiring little space.

According to the present invention a driven trolley for suspension from and travel on a rail comprises a pair of co-axial supporting wheels carried on shafts, one of the supporting wheels being disposed for location on each side of the rail, a driving motor having a driving shaft parallel with the supporting wheel shafts, and the ends of the motor driving shaft being connected by first and second belt drive apparatus to the supporting wheel shafts.

BRIEF DESCRIPTION OF THE DRAWINGS

The invention can be performed in various ways but one embodiment will now be described by way of example and with reference to the accompanying drawings, in which.

DETAILED DESCRIPTION OF A PREFERRED EMBODIMENT

Figure 2:
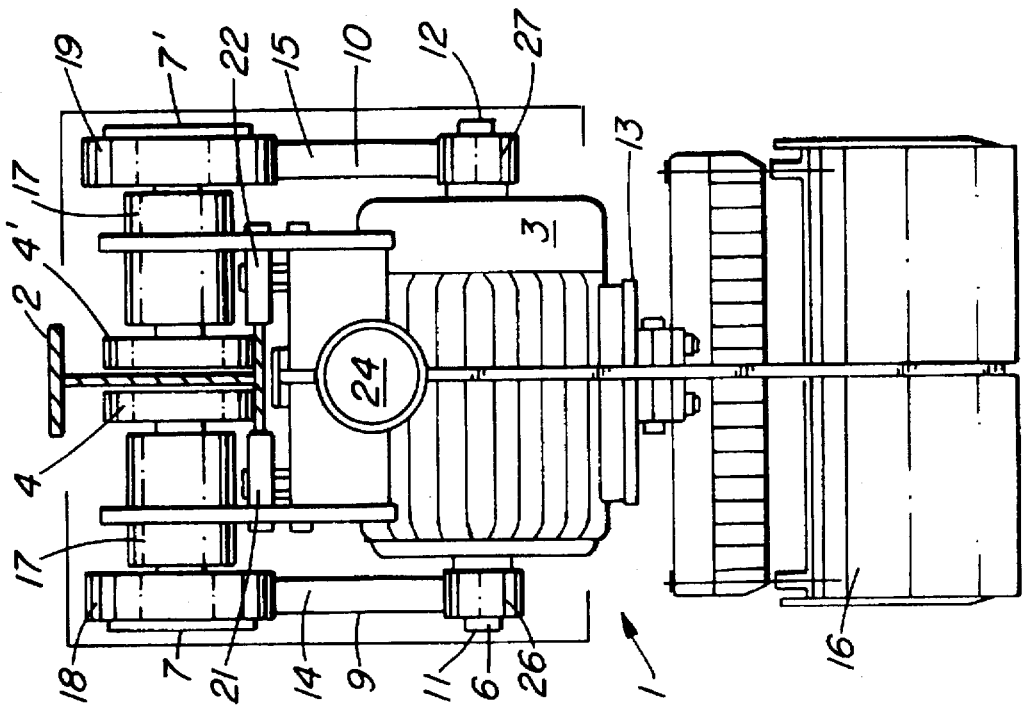
FIG. 2 is a front view of the trolley shown in FIG. 1.
Figure 1:
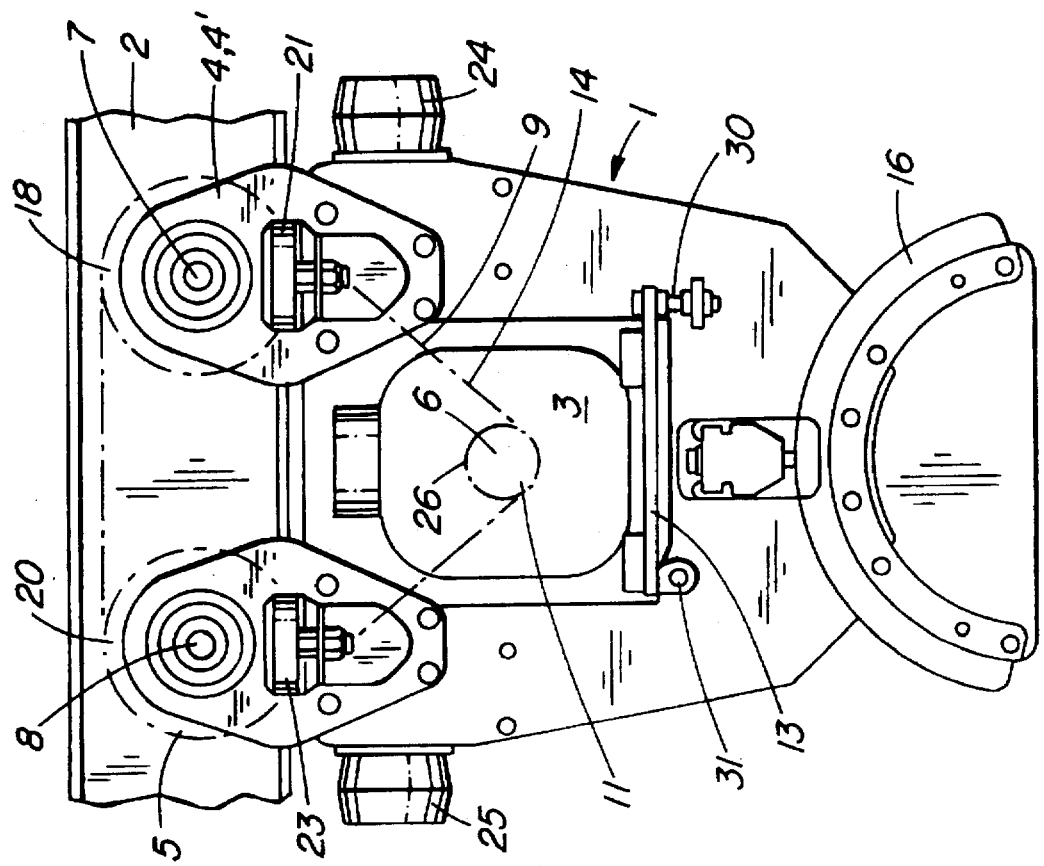
FIG. 1 is a side view of the trolley according to an embodiment of the invention suspended on a supporting rail.

The trolley 1 illustrated in FIGS. 1 and 2 is suspended by means of four supporting wheels, three of which are designated 4, 4' and 5, on a rail 2 with a double-T cross-section, which is best shown in FIG. 2. The supporting wheels 4, 4' and 5 run on the inner transverse surfaces of the lower (inverted) T. In each case, two supporting wheels, namely the supporting wheels 4 and 4' and the supporting wheels 5' are arranged co-axial with one another and in each case run on one side of the rail 2. The shafts 7 and 7' and 8 of the two pairs of supporting wheels are parallel to one another. Each supporting wheel is connected by means of a hub 17 to the trolley 1. The shafts 7, 7' and 8 of the supporting wheels 4, 4' and 5 run through bearing hubs 17, and on the outside protrude therefrom. Driving wheels 18, 19 and 20 are secured on the outer ends of the shafts 7, 7' and 8 so that rotation of these driving wheels 18, 19 and 20 causes rotation of the associated supporting wheels 4, 4' and 5.

While supporting wheels 4, 4' and 5 have shafts running horizontally, additional guiding wheels 21, 22 and 23 associated with each supporting wheel 4, 4' and 5 are provided with vertical shafts, the axes of the guiding wheels 21, 22 and 23 intersecting with those of the supporting wheels 4, 4' and 5. The horizontally arranged guiding wheels 21, 22 and 23 serve for lateral guidance of the trolley 1 and to this end bear on the ends of the transverse members of the inverted T of the double-T shaped rail 2.

On its underside the trolley 1 has a line carrying device 16 which takes the form of an essentially semi-circular double-sided support on which to lay lines, hoses, cables and the like, On its front and rear side, viewed in the path of the rail 2, the trolley 1 in each case has a buffer 24 and 25 which acts as a damper when two trolleys 1 run into one another or one trolley 1 runs into the wall.

The trolley 1 is driven by a three-phase motor 3 which is disposed with its driving shaft 6 parallel to the shafts 7, 7' and 8 of the supporting wheels 4, 4' and 5. The driving motor 3 is located under the arrangement of supporting and guiding wheels and over the supporting device 16 for the lines roughly level with the buffers 24 and 25. This is a synchronous three-phase motor, i.e. a motor which runs at nominal speed and without load practically without current and whose speed can be regulated precisely by the control frequency.

The driving motor 3 has a driving shaft 6 which projects on both sides and on each side carries a driving wheel 26 and 27 is essentially identical to the breadth of the driving wheels 18, 19 and 20 which are located on the shafts 7, 7' and 8 of the supporting wheels 4, 4' and 5. The driving wheel 26 is disposed in a plane with the driving wheels 18 and 20 of the supporting wheels running on one side of the rail 2; the other driving wheel 27 is disposed in a plane with the driving wheels 19 which are associated with the supporting wheels 4' running on the other side of the rail 2. As a result, in each case three wheel shafts, namely the shafts 6, 7 and 8 and the shafts 12, 7' and the shaft not shown running co-axially to the shaft 8 form a triangle lying in one plane. A V-belt or toothed belt 9 or 10 runs over the wheels associated with each shaft triangle. As can be seen from FIG. 1, the driving wheel 26 on the end 11 of the driving shaft 6 of the motor 3 drives the V-belt 9 which runs over the two driving wheels 18 and 20. Since the supporting wheels 4 and 5 are axially secured to the driving wheels 18 and 20 rotation of the driving shaft 6 of the motor 3 causes rotation of the supporting wheels 4 and 5 and hence movement of the trolley 1 on rail 2. This same driving process takes place in mirror-image form on the other side of the rail 2.

The driving motor 3 is mounted on an adjustable arm 13 and can be adjusted and fixed relative to a shaft 31 running parallel to the driving shaft 6 with the aid of an adjusting device 30. Thus, the belts 9 an 10 are tensioned when the arm 13 is pivoted downwards and relaxed when it is pivoted upwards.

The driving motor 3 is connected to a frequency changer whose electrical construction is essentially known. Thus, the speed of the motor 3 can be controlled by means of the output frequency of the frequency changer. The frequency changer is connected so that in the event of a rise in current due to a reduction in the speed of the trolley 1 and hence the speed of the motor 3, the control frequency is adapted to the new speed.

The trolley 1 is operated with a drag line device as follows:

After suspension from the rail 2 and loading of the carrier device 16 with lines, cable and hoses (not shown) and connection of the motor 3, the device is ready for operation. As a rule a plurality of line trolleys 1 are arranged on a rail 2 one behind another, for example as on an assembly line rail in a motor vehicle production plant or a rail arrangement for the travelling carriage of a crane. When the end user attached to the rail, i.e. the travelling carriage for example, is to be moved, the driving motors 3 of each trolley 1, are activated. For this, preferably the frequency is slowly ramped up and the speed continuously increased. A plurality of trolleys 1 are activated with different frequencies by a common circuit, the trolleys 1 standing next to the travelling carriage being activated with the highest frequency and the trolley 1 furthest back with the lowest frequency. This corresponds to the different optimum speeds of the line trolleys when the travelling carriage is moving.

Should slip occur in operation, the current consumed by the driving motor 3 increases, which leads to adjustment of the drive frequency. If, for example, one trolley runs into another, the resulting increase in current leads to a reduction in the control frequency. Since a frequency-controlled three-phase motor can turn at any slow speed in practice, creeping or inching and slow starting are also possible.

We claim:

1. A compact driven trolley for suspension from and travel on a single rail comprising:
   at least one pair of first and second co-axial supporting wheels for location on and engagement with opposite sides of the rail;
   first and second co-axial shafts each rotatably attached to the trolley and carrying the first and second wheels, respectively;
   a driving motor located in the trolley adjacent the lower face of the rail having a single drive shaft extending from both ends of the motor parallel with and adjacent to the first and second co-axial shafts carrying the wheels;
   a first belt drive means connecting the first shaft directly to one end of the motor drive shaft; and
   a second belt drive means connecting the second shaft directly to the other end of the motor drive shaft.

2. A trolley according to claim 1, including two pairs of co-axial supporting wheels providing said first and second coaxial supporting wheels, and third and fourth co-axial supporting wheels, each pair rotatably supported on the trolley by said first and second, and by third and fourth co-axial shafts, respectively.

3. A trolley according to claim 2, wherein the first belt drive means connects the first and third shafts directly to one end of the motor shaft.

4. A trolley according to claim 3, in which the driving motor is disposed on an arm which can be adjusted and fixed, and the adjustment of which changes the tension of at least one of the first and second belt drive means.

5. A trolley according to claim 3, in which the supporting wheels are separated and aligned for engagement with a rail having a double-T shaped cross-section, and in which the trolley includes a line carrying device for use with a drag line device.

6. A trolley according to claim 3, in which the driving motor is a three phase electric motor which is remotely actuated and controlled by a frequency changer constructed and arranged to vary the speed of the motor by changing the control frequency.

7. A trolley according to claim 2, wherein the second belt drive means connects the second and fourth shafts directly to the other end of the motor shaft.

8. A trolley according to claim 7, in which the driving motor is disposed on an arm which can be adjusted and fixed, and the adjustment of which changes the tension of at least one of the first and second belt drive means.

9. A trolley according to claim 7, in which the supporting wheels are separated and aligned for engagement with a rail having a double-T shaped cross-section, and in which the trolley includes a line carrying device for use with a drag line device.

10. A trolley according to claim 7, in which the driving motor is a three phase electric motor which is remotely actuated and controlled by a frequency changer constructed and arranged to vary the speed of the motor by changing the control frequency.

11. A trolley according to claim 2, wherein the first belt drive means connects the first and second shafts directly to one end of the motor shaft, and the second belt drive means connects the second and fourth shafts directly to the other end of the motor shaft.

12. A trolley according to claim 11, in which the driving motor is disposed on an arm which can be adjusted and fixed, and the adjustment of which changes the tension of at least one of the first and second belt drive means.

13. A trolley according to claim 11, in which the supporting wheels are separated and aligned for engagement with a rail having a double-T shaped cross-section, and in which the trolley includes a line carrying device for use with a drag line device.

14. A trolley according to claim 11, in which the driving motor is a three phase electric motor which is remotely actuated and controlled by a frequency changer constructed and arranged to vary the speed of the motor by changing the control frequency.

15. A trolley according to claim 2, in which the driving motor is disposed on an arm which can be adjusted and fixed, and the adjustment of which changes the tension of at least one of the first and second belt drive means.

16. A trolley according to claim 2, in which the supporting wheels are separated and aligned for engagement with a rail having a double-T shaped cross-section, and in which the trolley includes a line carrying device for use with a drag line device.

17. A trolley according to claim 2, in which the driving motor is a three phase electric motor which is remotely actuated and controlled by a frequency changer constructed and arranged to vary the speed of the motor by changing the control frequency.

18. A trolley according to claim 1, in which the driving motor is disposed on an arm which can be adjusted and fixed, and the adjustment of which changes the tension of at least one of the first and second belt drive means.

19. A trolley according to claim 18, in which the supporting wheels are separated and aligned for engagement with a rail having a double-T shaped cross-section, and in which the trolley includes a line carrying device for use with a drag line device.

20. A trolley according to claim 1, in which the driving motor is disposed on an arm which can be adjusted and fixed, and the adjustment of which changes the tension of both of the first and second belt drive means.

21. A trolley according to claim 1, in which the driving motor is a three phase electric motor which is remotely actuated and controlled by a frequency changer constructed and arranged to vary the speed of the motor by changing the control frequency.

22. A trolley according to claim 21, in which the supporting wheels are separated and aligned for engagement with a rail having a double-T shaped cross-section, and in which the trolley includes a line carrying device for use with a drag line device.

23. A trolley according to claim 1, in which the event of a rise in the current drawn by the motor as a result of a reduction in the speed of the trolley the frequency changer adapts the frequency to the new speed accordingly.

24. A trolley according to claim 23, in which the supporting wheels are separated and aligned for engagement with a rail having a double-T shaped cross-section, and in which the trolley includes a line carrying device for use with a drag line device.

25. A trolley according to claim 1, in which the supporting wheels are separated and aligned for engagement with a rail having a double-T shaped cross-section.

26. A trolley according to claim 1, in which the supporting wheels are separated and aligned for engagement with a rail having a double-T shaped cross-section, and in which the trolley includes a line carrying device for use with a drag line device.

* * * * *

UNITED STATES PATENT AND TRADEMARK OFFICE
CERTIFICATE OF CORRECTION

PATENT NO. : 5,711,228
DATED : Jan. 27, 1998
INVENTOR(S) : ITZIN et al.

It is certified that error appears in the above-indentified patent and that said Letters Patent is hereby corrected as shown below:

ON THE TITLE PAGE:

Please correct [73] Assignee to read as follows:

--[73] Assignee: Wampfler Aktiengesellschaft
Fed. Rep. of Germany--

Signed and Sealed this

Sixteenth Day of June, 1998

Attest:

BRUCE LEHMAN

Attesting Officer

Commissioner of Patents and Trademarks